United States Patent
Stewart

[19]

[11] Patent Number: 6,138,511
[45] Date of Patent: *Oct. 31, 2000

[54] MULTISENSOR WITH DIRECTLY COUPLED ROTORS

[75] Inventor: Robert E. Stewart, Woodland Hills, Calif.

[73] Assignee: Litton Systems, Inc., Woodland Hills, Calif.

[*] Notice: This patent is subject to a terminal disclaimer.

[21] Appl. No.: 09/365,514

[22] Filed: Aug. 2, 1999

Related U.S. Application Data

[63] Continuation of application No. 08/904,927, Aug. 1, 1997, Pat. No. 5,932,805.

[51] Int. Cl.[7] .......................................................... G01P 9/04
[52] U.S. Cl. ........................ 73/510; 73/504.04; 73/504.12
[58] Field of Search ......................... 73/510, 511, 504.02, 73/504.03, 504.04, 504.12

[56] References Cited

U.S. PATENT DOCUMENTS

| | | | |
|---|---|---|---|
| 4,795,258 | 1/1989 | Martin | 356/350 |
| 4,821,572 | 4/1989 | Hulsing, II | 73/510 |
| 4,841,773 | 6/1989 | Stewart et al. | 73/510 |
| 4,996,877 | 3/1991 | Stewart | 73/510 |
| 5,007,289 | 4/1991 | Stewart et al. | 73/510 |
| 5,065,627 | 11/1991 | Stewart et al. | 73/510 |
| 5,142,485 | 8/1992 | Rosenberg et al. | 73/510 |
| 5,428,995 | 7/1995 | Fersht et al. | 73/505 |
| 5,932,803 | 8/1999 | Wyse | 73/510 |
| 5,932,805 | 8/1999 | Stewart | 73/510 |

*Primary Examiner*—Helen C. Kwok
*Attorney, Agent, or Firm*—Elliott N. Kramsky

[57] ABSTRACT

A multisensor includes direct rotor coupling. A pair of rotors is mechanically coupled by a torsion bar whose stiffness largely determines the resonant frequency of the counteroscillating rotor pair. The axis of the torsion bar is coincident with the common axis of rotation of the rotors. Piezo bimorphs are fixed to opposed surfaces of radial vanes of the rotors which suspend the torsionally-coupled rotor pair with the case, isolating it from external angular vibration that could interfere with the resonant frequency of the rotor pair subassembly. The bimorphs receive signals for driving the oscillations of the rotors. Taken together, the stiffness of the vanes and the torsion bar substantially determine the common resonant frequency of the counteroscillating pair of rotors.

10 Claims, 3 Drawing Sheets

MULTISENSOR WITH DIRECTLY COUPLED ROTORS

CLAIM TO PRIORITY UNDER 35 U.S.C. 120

This application is a continuation of U.S. patent application Ser. No. 08/904,927 of Robert E. Stewart titled "Multisensor with Directly Coupled Rotors" filed Aug. 1, 1997 now U.S. Pat. No. 5,932,805.

BACKGROUND

1. Field of the Invention

The present invention relates to economical inertial navigation units (IMU's) for short range, relatively low accuracy guidance applications such as munitions. More particularly, this invention pertains to a multisensor of the type that employs paired triads of accelerometers mounted upon counteroscillating platforms for directly measuring linear accelerations and for determining rotation rates from Coriolis forces with respect to a three-axis system.

2. Description of the Prior Art

IMU's measure space-dependent rotations and accelerations with respect to orthogonal space axes. Their designs are beset by numerous difficulties as this requires the simultaneous measurement of six independent variables. For example, gyroscopes of the ring laser and fiber optic type require a lasing cavity dedicated to each input axis, mandating a total of three lasing cavities, an expensive undertaking, for obtaining three of the six measurements required of an IMU. (An example of a laser device for measuring rotation about three axes is shown in United States patent, property of the assignee herein, U.S. Pat. No. 4,795,258 of Martin entitled "Nonplanar Three-Axis Ring Laser Gyro With Shared Mirror Faces".) IMU's employing spinning wheel gyros must deal with such gyros' limitation to measurement of rotation with respect to two axes are limited to two axes of measurement, necessitating the use of an additional drive mechanism for the third input axis. Again, this does not in any way account for the additional complication introduced by the remaining measurements of accelerations with respect to the axes.

Simplicity and economy are particularly significant in the design of IMU's for munitions guidance and like applications. Such uses are characterized by non-reusable payloads, limited flight durations and only moderate accuracy requirements. One economical type of system for measuring both rotation rates and linear accelerations with reference to a set of three orthogonal axes is a multisensor mechanism taught in a series of United States patents, also the property of the assignee herein (U.S. Pat. No. 4,996,877 entitled "Three Axis Inertial Measurement Unit With Counterbalanced Mechanical Oscillator"; U.S. Pat. No. 5,007,289 entitled "Three Axis Inertial Measurement Unit With Counterbalanced, Low Inertia Mechanical Oscillator"; and U.S. Pat. No. 5,065,627 entitled "Three Axis Inertial Measurement Unit With Counterbalanced, Low Inertia Mechanical Oscillator.") The devices disclosed in the referenced patents employ piezoelectric drive mechanisms for driving a pair of counterbalanced platforms to oscillate out-of-phase about a common axis within a housing or case. Accelerometers housed in a vacuum to avoid the effects of gas damping are mounted in a tilted manner (for measuring variables in orthogonal planes) to radially-directed elements of the platforms provide measures of both linear acceleration and rotation. The latter (rotation) values are derived from the (Coriolis) forces sensed by the accelerometers at the resonant frequency of the counteroscillating structure.

The oscillatory motions of the rotors of the multisensors taught by the above-identified patents are coupled to one another through the case that houses the mechanism. Each rotor comprises three radially-directed rotor arms. An accelerometer is fixed to each rotor arm. The rotor arms alternate with rotor platforms, each including three radially-directed webs. Piezoelectric elements are mounted to either side of the outer webs. The elements are appropriately-poled so that an input drive voltage signal simultaneously induces compression and tension at the opposite surfaces to cause predetermined bending of the webs that results in oscillation of the rotors. The central web is relatively stiff. Such stiffness is the major factor that determines the natural or resonant frequency of the rotor.

Each rotor is bolted only to the case for support. As a result, the case provides the only path for transferring energy between the oscillating rotors. As mentioned earlier, measurement of rotation rate through sensing of Coriolis acceleration relies upon the demodulation of an output signal whose frequency is equal to the resonant frequency of the paired rotors. A single resonant frequency is assumed. The above-described design is subject to factors that can complicate the measurement of rotation rate to a significant extent. Many of such complications follow from the only-indirect coupling of energy (i.e. through the case) between the paired rotors.

Numerous arrangements can act to weaken the already-indirect coupling of energy. For example, many multisensor applications require that the case be hard-mounted to a body. In such applications, the mechanical impedance of the outside world is integrated into the coupling of the rotors so that the transfer of energy between the oscillating rotors is subject to attenuation in complex, and sometimes-unforeseen, ways. Thus, the accuracy of rotation rate measurement can vary as a function of application and changes in mechanical impedance.

Solutions to problems relating to weakly-coupled rotors to overcome the leakage of energy and problems related to differential rotor frequencies are quite complex and often expensive to implement. One solution, adjusting the relative amplitudes of the rotor drive voltages, can introduce bias effects, complicate system electronics, etc. Another solution is to mount the multisensor case on isolators so that the device is no longer hard-mounted to the outside world. While essentially solving the problems of external impedances, isolation-mounting multiplies mechanical complexity, size and cost, often to a significant extent.

SUMMARY OF THE INVENTION

The preceding and other shortcomings of the prior art are addressed by the present invention that provides a multisensor that includes a pair of rotors, each of which includes a plurality of radially-directed rotor arms. An accelerometer is fixed to each rotor arm. Each of the rotors is arranged to oscillate about a common axis. Means are associated with each rotor for oscillating the rotors substantially 180 degrees out-of-phase with respect to one another as are means for directly coupling the rotors to one another along the common axis. Such means has an axis of symmetry that is coincident with the common axis and includes (i) a cylindrical central member of a first diameter and (ii) cylindrical end members of a second, larger diameter.

The foregoing and other features and advantages of this invention will become further apparent from the detailed description that follows. This description is accompanied by a set of drawing figures. Numerals of the drawing figures, corresponding to those of the written description, point to the various features of the invention. Like numerals refer to like features throughout both the written description and the drawing figures.

DETAILED DESCRIPTION OF THE PREFERRED EMBODIMENT

Figure 1:
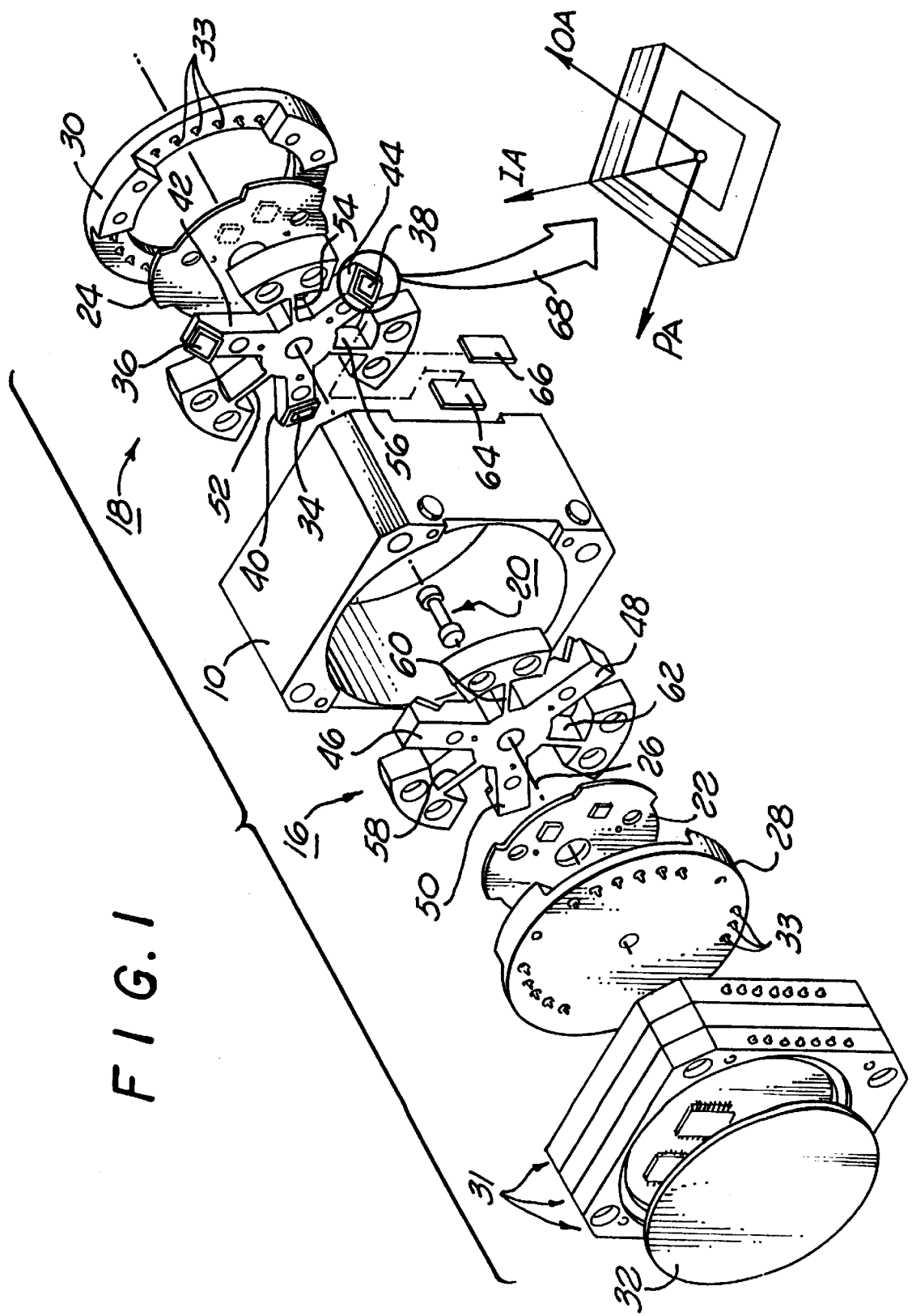
FIG. 1 is an exploded perspective view of a counterbalanced multisensor in accordance with the invention.

FIG. 1 is an exploded perspective view of a counterbalanced multisensor in accordance with the invention. The principal components and arrangements of the invention may be seen to include a multisensor case 10 that houses various multisensor mechanisms and provides a means for mounting to a body. Active mechanisms of the multisensor include a pair of rotors 16, 18 joined at a common torsion flexure 20. It shall be seen below that the arrangement of the rotors and the torsion flexure provides the multisensor with enhanced performance over prior art arrangements that rely solely upon a path through the case 10 for coupling rotational energy between the rotors 16 and 18. In the invention, the rotors 16, 18 will be seen to oscillate efficiently and 180° out-of-phase with respect to one another at a single resonant frequency $\omega_D$.

Hybrid substrates 22, 24 of circular shape are arrayed concentric with the common axis of oscillation 26 of the rotors 16, 18. The substrates 22, 24 include preamplifier electronics for use in servo-controlling the accelerometers fixed to the rotor. Disk-like rotor support plats 28, 30, and electronics housings 31 (each having an associated end plate 32) complete the major mechanical structures of the multisensor. Feedthroughs 33 within the peripheries of the rotor support plats 28, 30 provide communication with external electronics apparatus. Such apparatus inputs and receives signals for use in the servo-control, drive and output measurement and processing functions associated with the multisensor.

Both low frequency linear and resonant frequency accelerations are sensed by responsive mechanical apparatus. Accelerometer assemblies 34, 36 and 38 are angularly inclined adjacent the distal ends of arms 40, 42 and 44 respectively of the rotor 18. Like assemblies are fixed adjacent the distal ends of arms 46, 48 and 50 of the rotor 16. Each of the latter accelerometer assemblies is mounted at a complementary angle to that of the corresponding assembly of the rotor 18.

Radially-directed vanes 52, 54 and 56 are interspersed with the radially-directed rotor arms 40, 42 and 44 of the rotor 18 while a similar arrangement pertains to the relationship between flexure vanes 58, 60 and 62 and the rotor arms 46, 48 and 50 of the rotor 16.

The oscillatory movements of the rotors 16 and 18 with respect to the common axis 26 result from forces applied to the vanes 52 through 62. Such forces are induced by the application of dither drive voltages to sets of vane-fixed piezoelectric bimorphs, such as the bimorphs 64, 66 located at opposed surfaces of the vane 56. Pairs of driving bimorphs are fixed to two vanes of each rotor with a pair of pickoff bimorphs fixed to the third vane. The pairs of driving piezoelectric bimorphs fixed to the opposed surfaces of the rotor vanes alternately expand and contract in response to applied dither drive voltages causing the vanes to impart angular motion to the rotors 16 and 18 and, of course, to the accelerometer triads mounted thereto while voltages induced in the flexed third vane induce a pickoff signal for use in regulating the amplitude of oscillations. The desired 180° out-of-phase oscillatory relationship between the rotors 16 and 18 may be accomplished through a number of arrangements including application of out-of-phase drive signals to the bimorphs of corresponding vanes of the opposed rotors 16 and 18 as well as affixation of oppositely-poled bimorphs to the surfaces of corresponding radial vanes of the rotors 16 and 18 while applying identical drive voltages.

An enlarged view of the representative accelerometer 38 that is fixed to the arm 44 of the rotor 18 is identified and located by means of an arrow 68. In FIG. 1 an orthogonal coordinate system is superimposed upon the accelerometer 38 for indicating various axes whose significance will become further apparent below. An axis denoted OA is aligned within the hinge of the accelerometer 38. This axis is perpendicular to an axis PA that passes through the center of gravity in the plane of the pendulous mass of the accelerometer 38. An input axis IA is perpendicular to the plane of the axes OA and PA.

Figure 2A:
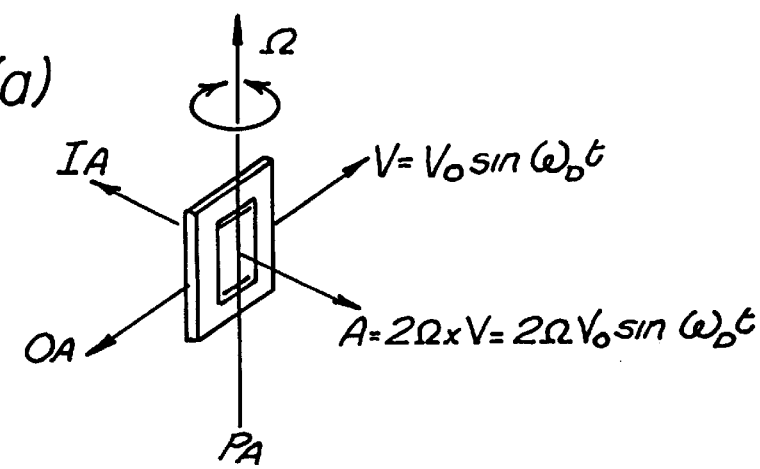
FIGS. 2(a) and 2(b) are schematic views of an accelerometer and of the counteroscillatory structure, respectively, of a counterbalanced multisensor.
Figure 2B:
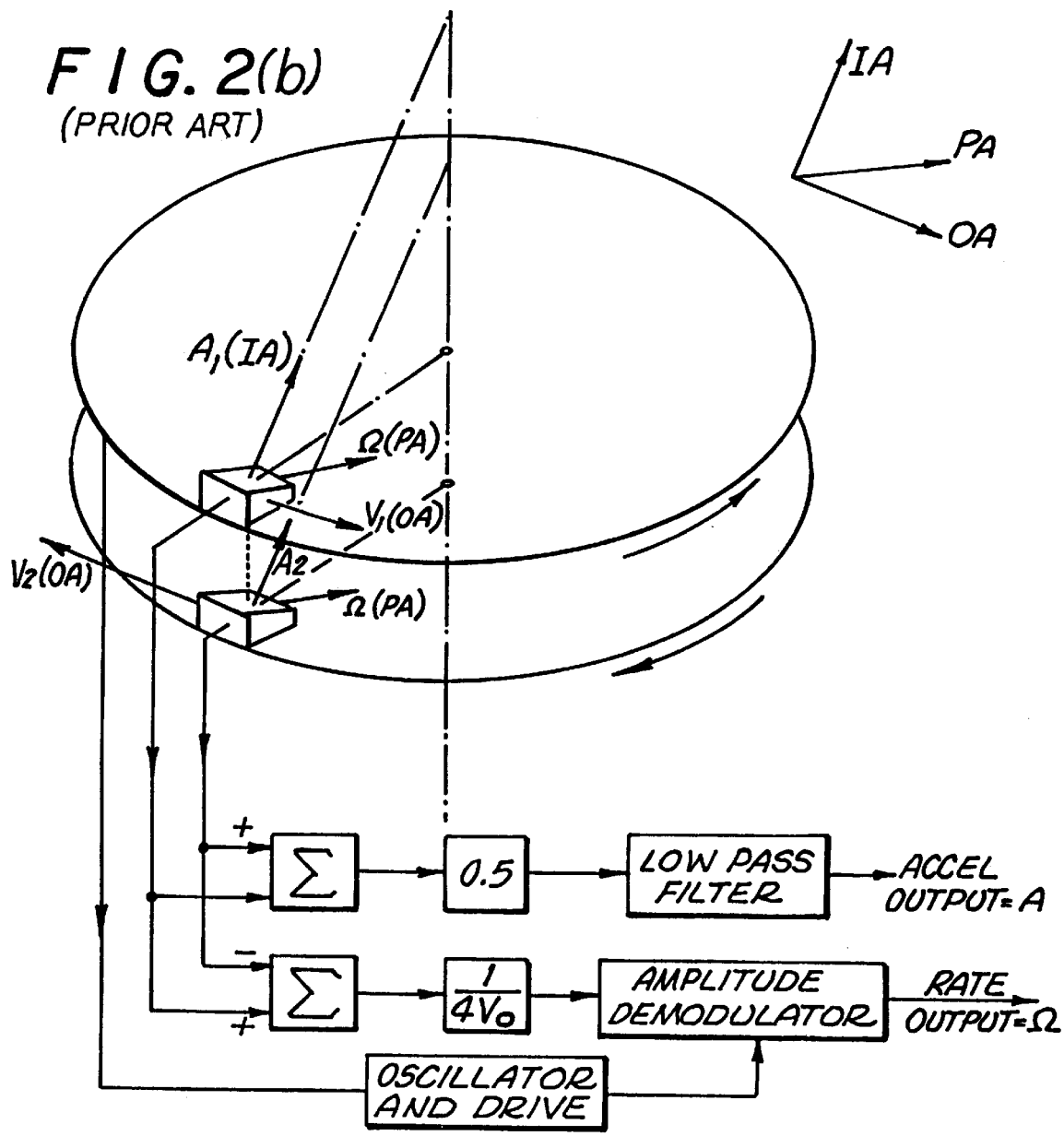

The theory of operation of a counterbalanced multisensor will be discussed with reference to FIGS. 2(a) and 2(b), each of which provides a schematic view in perspective of a central aspect of the system. In FIG. 2(a) there is illustrated a representative accelerometer with axes and vectors marked thereon indicative of a Coriolis acceleration output. FIG. 2(b) illustrates the operation of an array of accelerometers within the counterbalanced system of an accelerometer.

In such a system, six micromachined silicon accelerometers permit complete measurement of the linear acceleration and angular rate of a host vehicle in body-fixed coordinates by making direct measurements of total acceleration with respect to the body axes. The total acceleration measurements are corrected for the Coriolis acceleration which is used to determine body angular rate.

Referring specifically to FIG. 2(a), Coriolis acceleration is measured as the cross product $\overline{A}_C = 2\overline{\Omega} \times \overline{V}$ where $\overline{\Omega}$ is the body angular rate vector and $\overline{V}$ is the instantaneous relative velocity of the sensor mount with respect to the host vehicle. Thus the sensor, when set in motion with a relative velocity in the direction of the output axis OA, permits an angular rate about the pendulous axis PA to be observed as part of an acceleration measured along the input axis IA. The Coriolis acceleration measurement permits angular rate $\Omega$ to be observed with accelerometers of the multisensor. However, a procedure is then required for separating the linear and Coriolis acceleration components from one another.

One approach to such separation is to induce a sinusoidal relative velocity in the form $$\overline{V} = \overline{V}_o \sin \omega t \qquad (1)$$

The corresponding Coriolis acceleration is then $$\overline{A}_c = 2\overline{\Omega} \times \overline{V}_0 \sin \omega t \qquad (2)$$

Thus, as long as an additive linear acceleration does not produce a component in the frequency band of the Coriolis part, then demodulation at $\omega_D$ of the accelerometer's output yields a measurement of angular rate about the PA axis of (each) accelerometer. Similarly, the low frequency linear acceleration component is obtained by low-pass filtering. As mentioned earlier, linear acceleration is near d.c. while the angular velocity is modulated with the much higher frequency $\omega_D$.

Referring now to FIG. 2(b), the accelerometers are oriented with their input axes inclined with respect to their corresponding planes of motion to move at 180° out of phase with one another on the counter-vibrating rotors 16, 18. In the presence of an angular rate Ω along PA and an acceleration component A along IA (refer to FIG. 2(a)), the total acceleration measured by each is:

$$A_1 = A + 2\Omega V_0 \quad (3)$$

$$A_2 = A - 2\Omega V_0 \quad (4)$$

Thus, $$A = \frac{1}{2}(A_1 + A_2) \quad (5)$$

and $$\Omega = (\frac{1}{4}V_0)(A_1 - A_2) \quad (6)$$

A more accurate procedure for in defining Ω(t) is derived from the general relations $$A_1(t) = A(t) + 2\Omega(t)V_0 \sin \omega t + e_1(t) \quad (7)$$

$$A_2(t) = A(t) - 2\Omega(t)V_o \sin \omega t + e_2(t) \quad (8)$$

where $e_1(t)$ and $e_2(t)$ are high-frequency vibration effects that may be considered as error terms. Upon elimination of A(t), the following results $$\Omega(t) \sin \omega t = \frac{1}{4}V_o[A_1(t) - A_2(t)] - (\frac{1}{4}V_0)[e_1(t) - e_2(t)] \quad (9)$$

Assuming that none of the structural natural frequencies of the multisensor are close to the modulated band of Ω(t), then $e_1(t)$ and $e_2(t)$ basically cancel one another, leaving the following expression for Ω(t):

$$\Omega(t) = (\frac{1}{4}V_0)[A_1(t) - A_2(t)] \quad (10)$$

Figure 3:
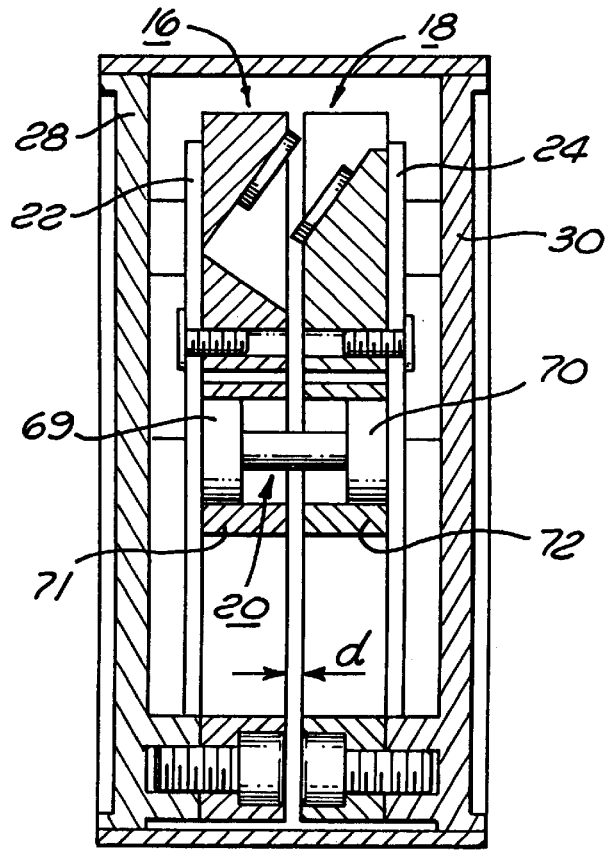
FIG. 3 is a cross-sectional view in elevation of the multisensor of the invention.

FIG. 3 is a cross-sectional view in elevation of the multisensor of the invention taken. It is to be understood that the sectional view is of the device in assembled form. As shown, the torsion flexure 20 is fixed by suitable adhesive such as the resinous catalytic adhesive marketed under the trademark "EPOXY" (alternative: laser welding), at its opposed, enlarged-diameter ends 69, 70 to aligned apertures within the central hubs 71, 72 of the rotors 16 and 18 respectively. In an actual embodiment of the invention, the torsion flexure 20 was of overall length 0.34 inches with an elongated central portion 0.197 inch long and of 0.074±0.001 inch diameter. Enlarged-diameter end sections 69, 70 were machined to 0.1960±0.0005 inches. The torsion flexure 20 was manufactured of 300 Series corrosion-resistant stainless steel ("CRES"). When assembled, a clearance d of 0.02 inches was provided between the adjacent surfaces of the rotors 16, 18. The material composition of the torsion flexure 20 is chosen for compatibility, in terms of thermally-induced axial expansion, with the material of the case 10. The case 10 may, in turn, be fabricated of such materials as Hi-Mu 80 (a nickel-iron alloy) or Carpenter 49.

As can be seen from FIG. 3, the substrates 22, 24 are affixed to the outwardly-facing surfaces of the rotors 16 and 18 respectively. The rotor support plats 28, 30 are laser welded to opposed ends of the interior cylindrical cavity of the multisensor case 10. The laser weld provides the necessary hermetic seal for maintaining a vacuum inside the case 10.

While the substrates 22, 24 are fastened to the arms of the rotors 16, 18, the mounts are fastened to the plats 28, 30 by means of bolts, screws or the like. As mentioned earlier, the support plats 28, 30 are fixed to the ends of the case 10, rendering the rotors 16, 18 partially case-fixed. However, the direct coupling provided by the torsion flexure 20 effectively channels the major portion of the torsional energy that is alternately stored as potential energy and expended as kinetic energy within the subassembly comprising the rotors 16, 18 and the torsion flexure 20. Thus, unlike the prior art, which relies entirely upon the multisensor casing as a medium of transfer of energy between the rotors, only a small amount of such energy is transferred through it in the present invention.

Figure 4:
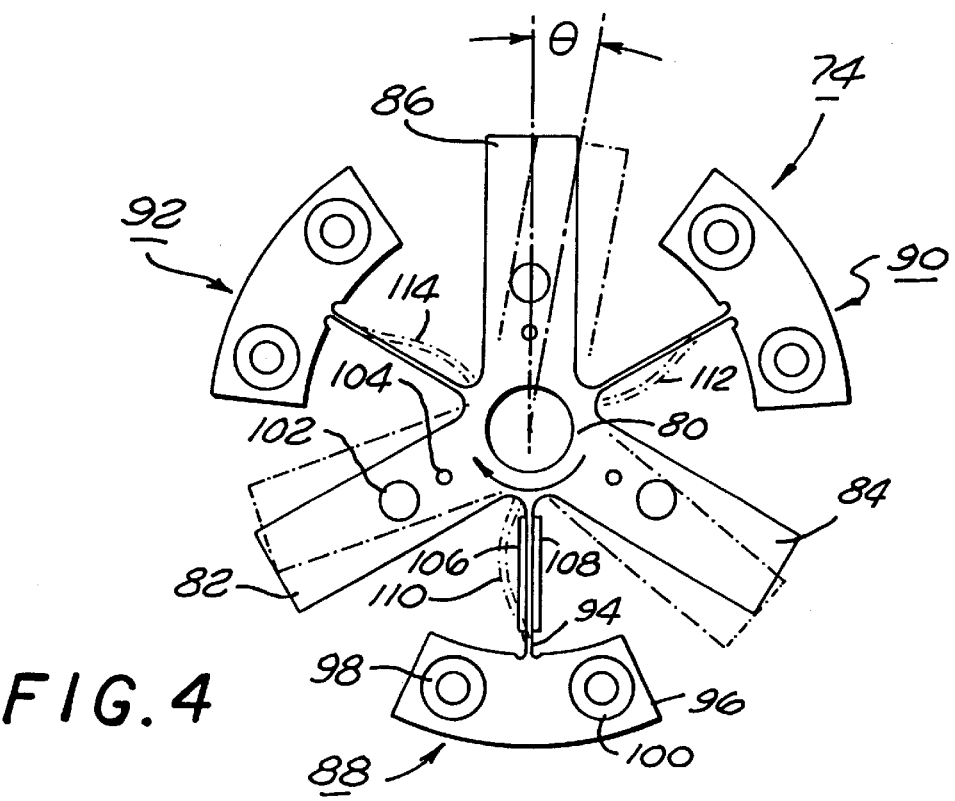
FIG. 4 is a top plan view of a rotor in accordance with the invention with flexure vanes shown in shadow outline to illustrate the operation thereof.

FIG. 4 is a top plan view of a rotor 74 in accordance with the invention with flexure vanes shown in shadow outline to illustrate the operation thereof. As can be seen, an enlarged-diameter end 76 of a dumbell-shaped torsion flexure is either adhesively fixed or laser-welded within a central aperture 78 of the hub 80 of the rotor arm. As mentioned earlier, the center of the aperture 78 is aligned with the shared axis of oscillation of the rotor pair.

As also mentioned earlier, the rotor 74 comprises two distinct radially-directed structures that emanate from the central hub 80. These include two overlapping, Y-shaped assemblies that are symmetrical with respect to one another. Three equiangularly-spaced rotor arms 82, 84, 86 alternate with piezoelectric-fixed assemblies 88, 90, and 92. As mentioned earlier, accelerometers are fixed to the rotor arms 82, 84, 86 for measuring both linear and Coriolis accelerations.

Referring to the representative drive assembly 88, this is seen to include a flexible vane 94 that is fixed to, and radiates from, the central hub 80 which is, in turn, fixed to the end 76 of the torsion flexure. This is in contrast to drive assemblies of prior art multisensors, such as taught by the above-referenced United States patents, in which each assembly includes three radial elements—a stiff central member and a lateral pair of thin vanes or webs. Pairs of poled bimorphs are fixed to the lateral webs for driving each assembly. Such complex prior art drive assemblies require the stiff central member to set the resonant frequency of the system of counterrotating rotor platforms since the piezoelectric bimorphs are fixed to the compliant webs by lossy (i.e. damping) organic adhesive material. Thus, the prior art design is strongly coupled to the case through the stiff central members. In contrast, the rotor and torsion flexure subassemblies are coupled to the case solely through flexible vanes that possess natural frequencies below that of the subassembly, isolating it from external angular vibrations capable of interfering with resonant frequency oscillations. Also, the present invention permits a much simpler (both mechanically and electronically) drive assembly as the common torsion flexure, rather than the stiff central member(s), is the major factor in setting the resonant frequency of the counter-oscillating structure. (Note: In each case, the vanes that support piezoelectric bimorphs contribute 20–30% in establishing the resonant frequency of the counteroscillating rotor pair.)

A pair of apertures 98, 100 is provided within peripheral mount 96 for receiving fasteners that fix the mount 96 to a rotor support plat (not shown) in an arrangement such as that illustrated in FIG. 3 above. Referring to the representative rotor arm 82, apertures 102, 104 are provided for fixing a hybrid substrate (not shown) to the rotor arms for oscillation therewith. Again, the details of such affixation are illustrated in FIG. 3. In this way, the requisite electrical connections between multisensor electronics and the accelerometers fixed to the rotor arms 82, 84, 86 are not jeopardized in operation.

A pair of piezoelectric bimorphs 106, 108 is fixed to opposed sides of the vane 94. The bimorphs 106, 108 fixed to two of three vanes per rotor are electrically connected to drive circuitry for generating appropriately-phased signals to induce simultaneous compression and tension forces at opposite sides of the vane 94, periodically replenishing expended oscillatory energy and causing bowing while those fixed to opposed sides of the third vane are connected to detector circuitry. The dashed line 110 indicates representative bowing of the vane 94 partially in response to the input of signals for inducing tension and compression within the bimorphs 106 and 108 respectively.

Angular rotation of amplitude 8 of the central hub 80 and the affixed rotor arms 82, 84, 86 that carry multisensor accelerometers at the excited resonant frequency of the rotor pair is maintained by the simultaneous outward bowing of the vanes of the drive elements 88, 90, 92 (indicated by 110, 112 and 114) in a single direction. Such simultaneous bowing of the vanes of the three case-fixed mounts produces angular displacement Θ of the hub 80 and attached rotor arms 82, 84, 86 in the direction 116. It will be appreciated that the same process takes place with regard to the rotor fixed to the opposed end of the torsion flexure, with the bowings of the sets of vanes of the rotors 16 and 18 always being opposite one another to induce counteroscillation. The generation of signals for producing the requisite paired compression and tension with piezoelectric bimorphs fixed to opposed sides of a vane, as well as circuitry for receiving the output of the pair of pickoff bimorphs and employing it to regulate the amplitude of oscillation is well known in the art. Further, the design and poling of paired bimorphs for generating the desired bowing of associated vanes in conjunction with an applied drive signal is also well understood in the art.

As mentioned earlier, it is extremely advantageous that the paired rotors of a multisensor counteroscillate at a single resonant frequency. In the invention, this is assured by the direct coupling afforded along the common axis of rotation through the torsion flexure that is fixed, at its opposed ends, to the hubs of the paired rotors. Such mechanical coupling provides a mechanical path for transferring energy directly and reversibly between the counteroscillating rotors. The direct coupling of energy through the torsion flexure insures the establishment and maintenance of a common resonant frequency $\omega_D$ and, as a consequence, assures that the transfer of energy therebetween is a maximum. Such energy readily dampens oscillations of different frequencies while amplifying those at the common resonant frequency. Thus, in addition to overcoming the substantial complications introduced when a common resonant frequency of oscillation is not established, the strong forces established for driving the two rotors at a single resonant frequency assure that oscillations are stabilized at the common resonant frequency, providing a high Q, and therefore low random walk, system.

While the invention has been described with reference to its presently preferred embodiment it is not limited thereto. Rather, this invention is limited only insofar as defined by the following set of patent claims and includes within its scope all equivalents thereof.

What is claimed is:

1. A multisensor comprising, in combination:
    a) a pair of rotors, each of said rotors including a plurality of radially-directed rotor arms;
    b) an accelerometer being fixed to each of said rotor arms;
    c) each of said rotors being arranged to oscillate about a common axis;
    d) a drive assembly associated with each of said rotors for oscillating said rotors substantially 180 degrees out-of-phase with respect to one another; and
    e) a torsion flexure for directly coupling said rotors to one another along said common axis, said torsion flexure having an axis of symmetry coincident with said common axis and comprising (i) a central member and (ii) end members.

2. A multisensor as defined in claim 1 wherein each of said rotors further comprises:
    a) a central hub;
    b) said rotor arms being joined to and extending radially from said hub;
    c) a plurality of drive assemblies; and
    d) each of said drive assemblies comprising a single radially-directed vane fixed to and extending from said hub and having a pair of piezoelectric elements fixed to opposed sides of said vane.

3. A multisensor as defined in claim 2 wherein each of said assemblies further includes a peripheral mount fixed to the end of said vane opposite said hub.

4. A multisensor as defined in claim 3 further including:
    a) a case;
    b) each of said rotors being located within said case; and
    c) said peripheral mounts being fixed to said case.

5. A multisensor as defined in claim 4 further including:
    a) said case comprising a body having a cylindrical internal cavity for accommodating said rotors;
    b) a pair of rotor support plats fixed to opposed ends of said cavity; and
    c) said peripheral mounts being fixed to said plats.

6. A multisensor as defined in claim 5 further including:
    a) a pair of hybrid substrates; and
    b) said substrates being fixed to the rotor arms of said rotors.

7. A multisensor as defined in claim 2 further including:
    a) said central hub has a central aperture;
    b) said central aperture is aligned with said common axis; and
    c) an end member of said torsion flexure being fixed to each of said rotors at said aperture.

8. A multisensor as defined in claim 7 wherein said end member is fixed to each of said rotors by means of an adhesive.

9. A multisensor as defined in claim 8 wherein said adhesive is a resinous catalytic adhesive.

10. A multisensor as defined in claim 7 wherein a laser weld fixes said end member to each of said rotors.

* * * * *